United States Patent
Di Sacco

(10) Patent No.: US 12,429,011 B2
(45) Date of Patent: Sep. 30, 2025

(54) DRIVING ENGINE FOR VEHICLES

(71) Applicant: FERRARI S.P.A., Modena (IT)

(72) Inventor: Michele Di Sacco, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/815,918

(22) Filed: Aug. 27, 2024

(65) Prior Publication Data

US 2025/0075671 A1 Mar. 6, 2025

(30) Foreign Application Priority Data

Sep. 4, 2023 (IT) .......................... 102023000018096

(51) Int. Cl.
| | | |
|---|---|---|
| *F02F 3/28* | (2006.01) | |
| *F02B 75/22* | (2006.01) | |
| *F16J 7/00* | (2006.01) | |

(52) U.S. Cl.
CPC ................ *F02F 3/28* (2013.01); *F02B 75/22* (2013.01); *F16J 7/00* (2013.01)

(58) Field of Classification Search
CPC ................ F02F 3/28; F02B 75/22; F16J 7/00
See application file for complete search history.

(56) References Cited

U.S. PATENT DOCUMENTS

| | | | | |
|---|---|---|---|---|
| 2,409,555 A | * | 10/1946 | Foure ...................... | F02F 1/183 277/482 |
| 4,362,135 A | * | 12/1982 | Irimajiri .................. | F02F 1/183 123/193.6 |
| 4,383,508 A | | 5/1983 | Irimajiri et al. | |
| 4,466,400 A | * | 8/1984 | Irimajiri .................. | F02F 1/183 123/193.6 |
| 8,347,843 B1 | * | 1/2013 | Batiz-Vergara ......... | F02F 3/027 123/41.35 |
| 8,555,828 B2 | * | 10/2013 | Jones ...................... | F02B 75/24 123/47 R |
| 8,578,895 B2 | * | 11/2013 | Baldini ................... | F02B 33/44 123/65 R |
| 10,138,807 B2 | * | 11/2018 | Yoshizawa .............. | F02B 75/32 |
| 10,989,138 B2 | * | 4/2021 | Dalmas, II ................ | F01L 3/00 |

FOREIGN PATENT DOCUMENTS

| | | |
|---|---|---|
| DE | 3803152 A1 | 8/1989 |
| GB | 276546 A | 9/1927 |

OTHER PUBLICATIONS

Italian Search Report in IT Application No. 202300018096, mailed Mar. 15, 2024, an English Translation attached hereto (6 pages).

* cited by examiner

*Primary Examiner* — Grant Moubry
*Assistant Examiner* — James G Moubry
(74) *Attorney, Agent, or Firm* — Leason Ellis LLP

(57) ABSTRACT

A driving engine for vehicles has at least two cylinders aligned with one another and engaged by respective pistons in a sliding manner, each of which is connected with a crankshaft by means of the interposition of a connecting rod, and is delimited by a free face having a first width, measured parallel to a rotation axis of the crankshaft, smaller than a second width measured transverse to the first width.

10 Claims, 6 Drawing Sheets

DRIVING ENGINE FOR VEHICLES

CROSS-REFERENCE TO RELATED APPLICATIONS

This patent application claims priority from Italian patent application no. 102023000018096 filed on Sep. 4, 2023, the entire disclosure of which is incorporated herein by reference.

TECHNICAL FIELD

The present invention relates to a driving engine for vehicles.

In particular, the present invention relates to a driving engine of the type comprising a crankshaft mounted so as to rotate around a rotation axis; at least one group of cylinders comprising, in turn, at least two cylinders aligned with one another in a direction parallel to the rotation axis of the crankshaft; a piston engaged in each cylinder in a sliding manner; and at least one connecting rod interposed between each piston and the crankshaft to convert the rectilinear reciprocating motion of the pistons along the relative cylinders into a rotational motion of the crankshaft.

BACKGROUND

As pistons have a cylindrical shape, the driving engines for vehicles of known type described above have some drawbacks, mainly deriving from the fact that the group of cylinders and of relative pistons has a relatively high longitudinal footprint, measured parallel to the rotation axis of the crankshaft.

SUMMARY

The object of the present invention is to provide a driving engine for vehicles without the drawbacks set forth above and which is simple and inexpensive to produce.

According to the present invention, there is provided a driving engine for vehicles as claimed in the appended claims.

BRIEF DESCRIPTION OF THE DRAWINGS

The present invention will now be described with reference to the accompanying drawings, which illustrate a non-limiting example of embodiment thereof, wherein.

DESCRIPTION OF EMBODIMENTS

Figure 1:
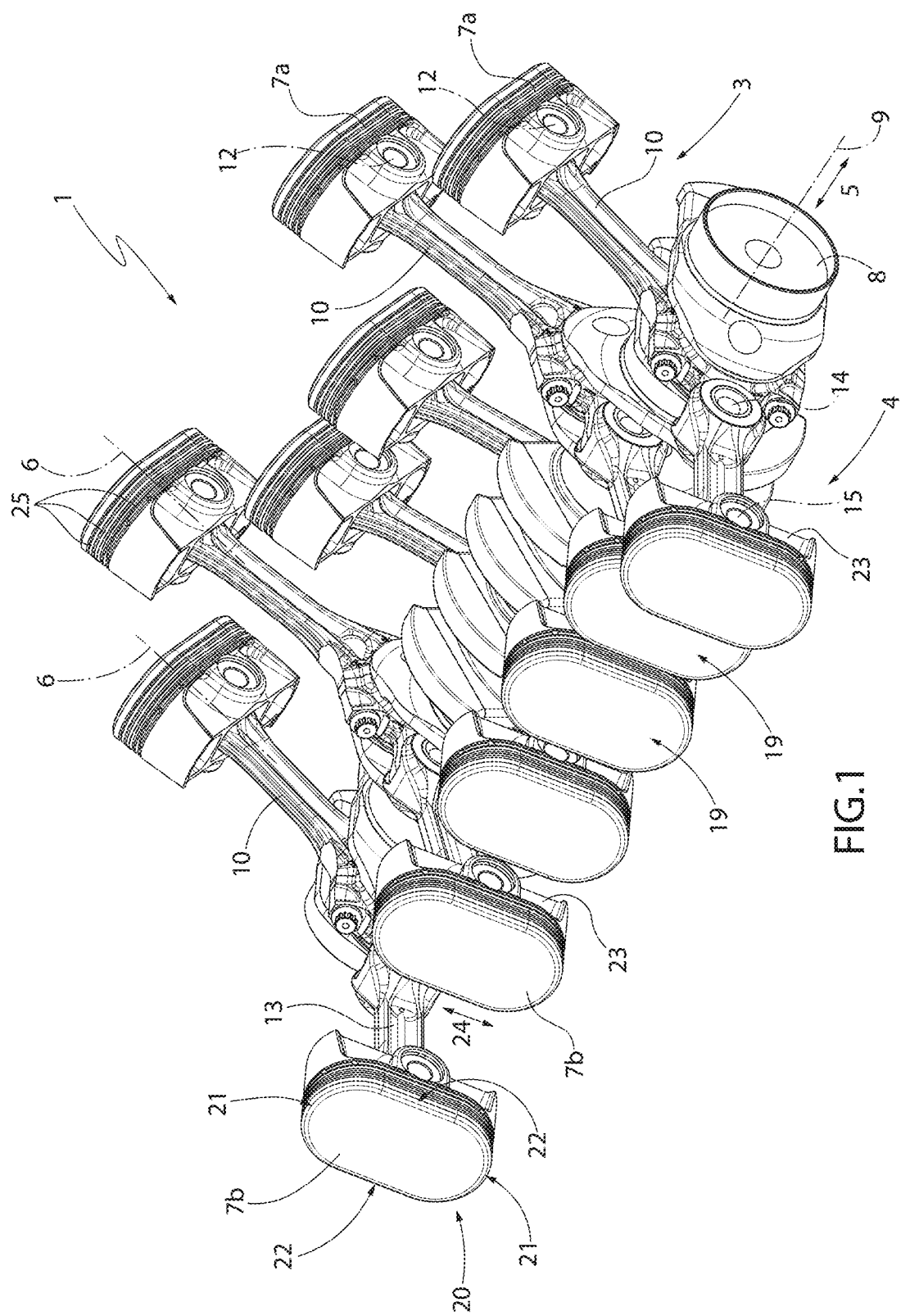
FIG. 1 is a schematic perspective view of a preferred embodiment of the driving engine for vehicles of the present invention.
Figure 2:
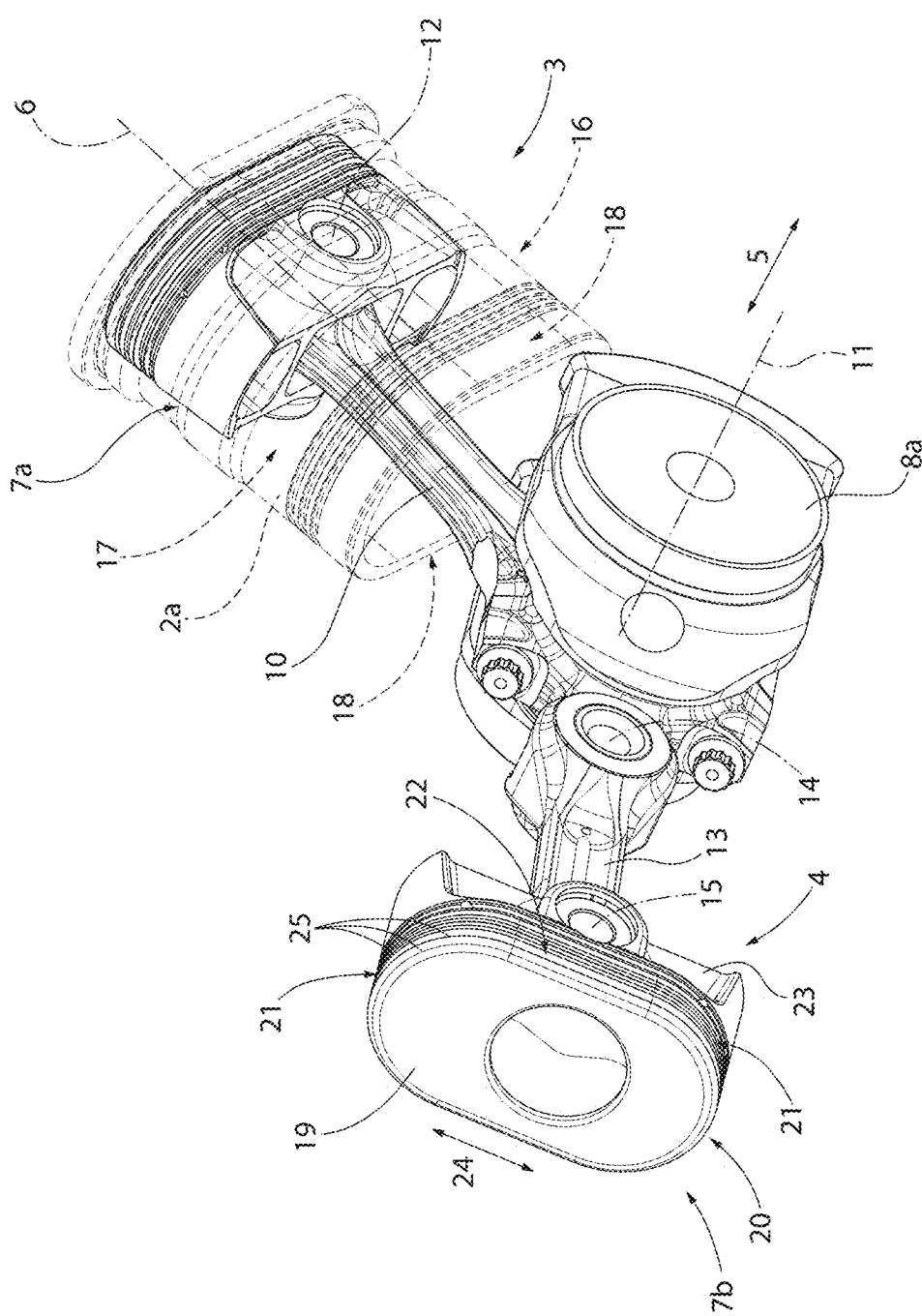
FIGS. 2 and 3 are two schematic perspective views, with parts removed for clarity, of a detail of the driving engine of FIG. 1.
Figure 3:
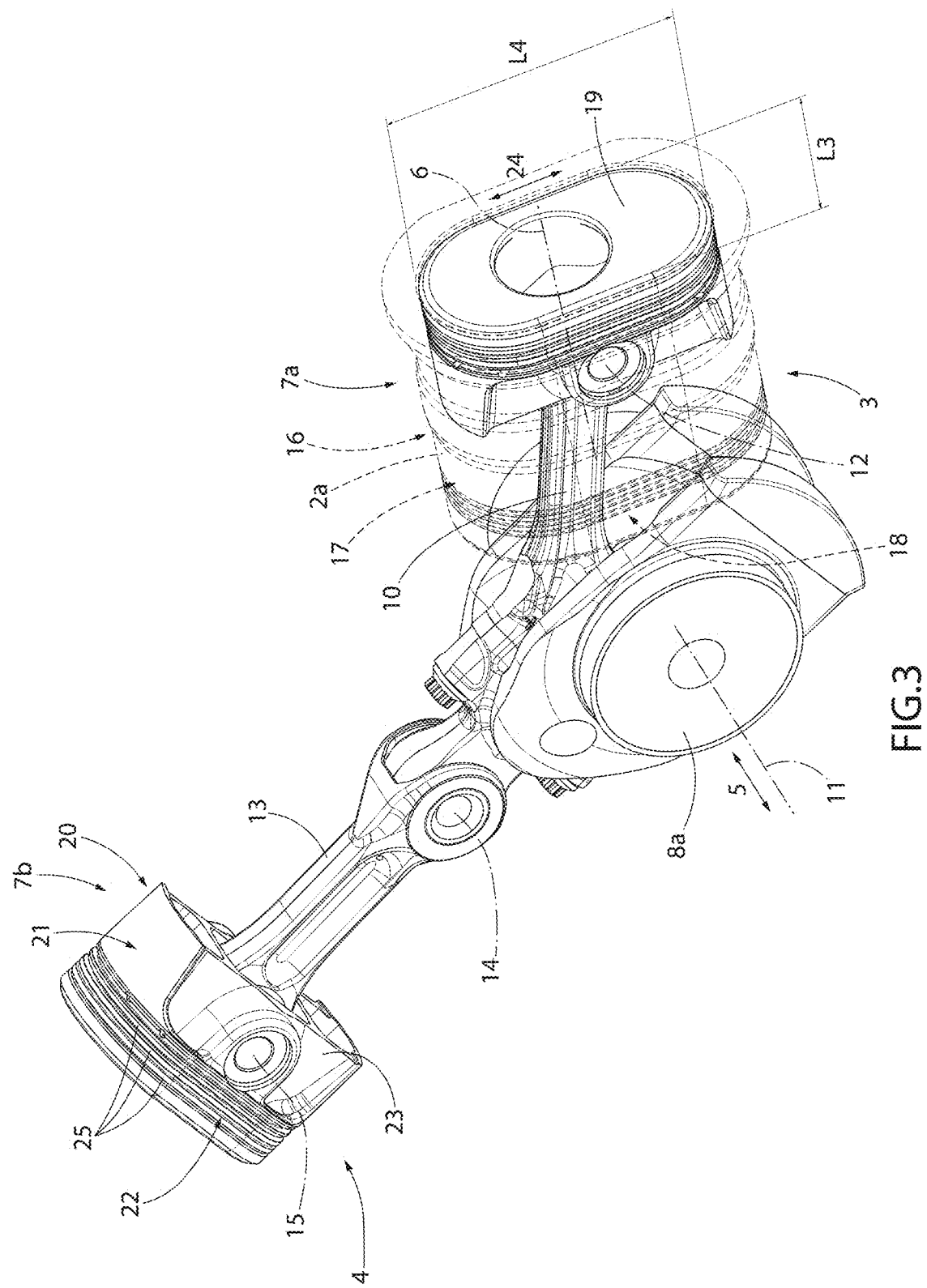
Figure 4:
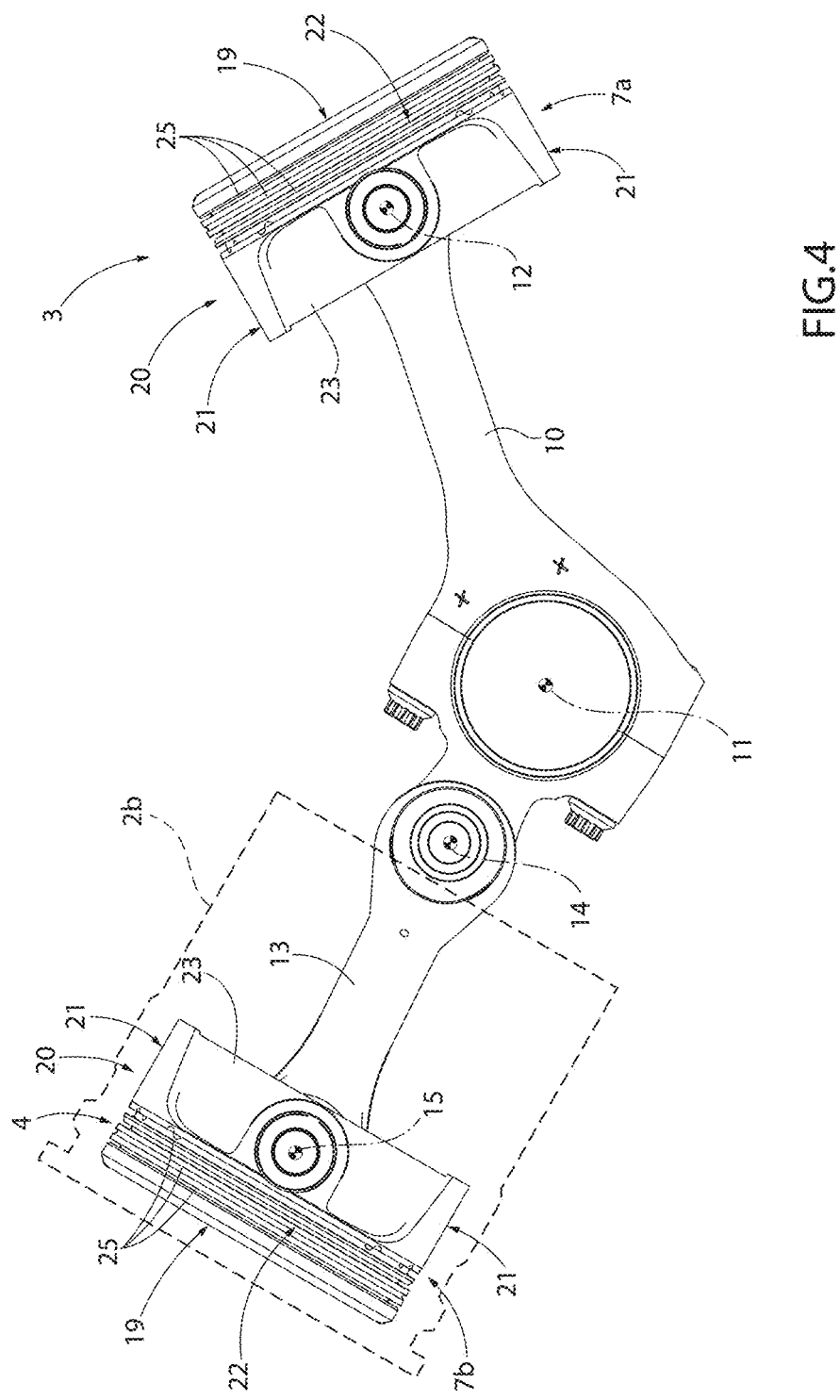
FIGS. 4 and 5 are two schematic side views, with parts removed for clarity, of the detail of FIGS. 2 and 3.
Figure 5:
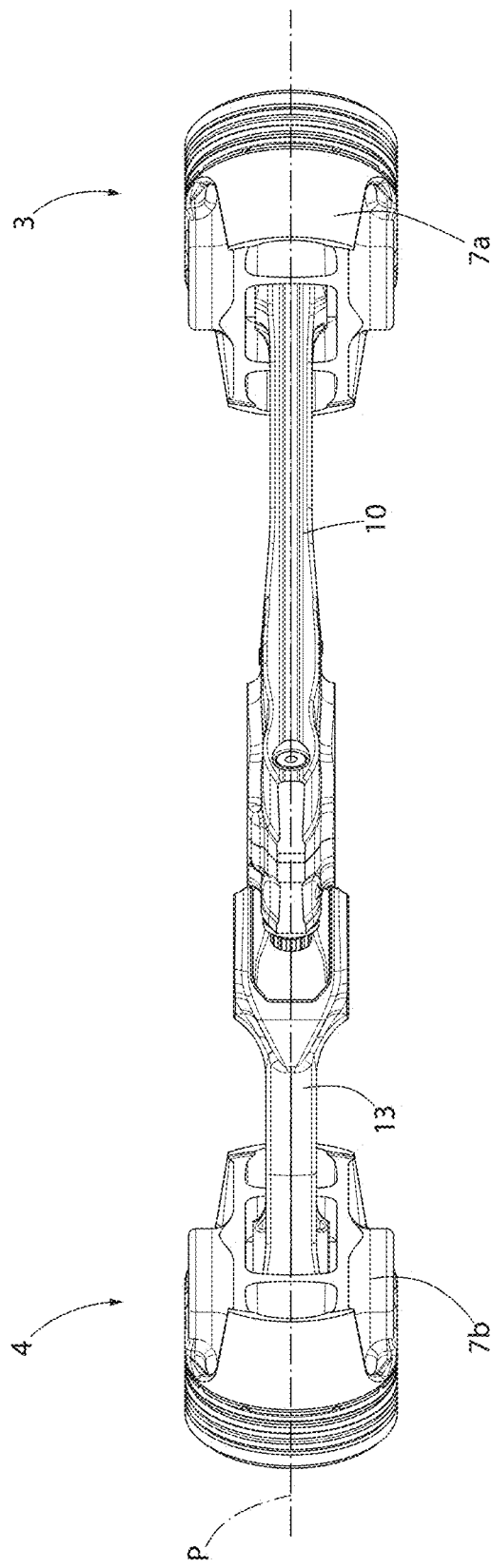

With reference to FIGS. 1, 2, 3, 4, and 5, the reference number 1 indicates, as a whole, a driving engine for vehicles comprising, in this case, twelve cylinders 2a, 2b arranged according to two groups 3, 4 of cylinders 2a, 2b placed side by side. Cylinder 2a is shown in FIGS. 2 and 3 and cylinder 2b is generally shown in FIG. 4 for ease of illustration; however, the two cylinders 2a, 2b have the same configuration.

Each group 3, 4 of cylinders 2a, 2b comprises, in this case, six cylinders 2a, 2b, which are aligned with one another in a direction 5, have respective longitudinal axes 6 parallel to one another, and are engaged in a sliding manner by respective pistons 7a, 7b.

The pistons 7a, 7b are moved with a rectilinear reciprocating motion along the relative cylinders 2a, 2b by the thrust generated by the chemical reaction generated by the combustion of a fuel and a comburent inside the cylinders 2a, 2b.

The reciprocating rectilinear motion of the pistons 7a, 7b along the relative cylinders 2a, 2b is converted into a rotational motion of a crankshaft 8 mounted to rotate around a rotation axis 9 parallel to the direction 5.

The pistons (hereinafter indicated with 7a) associated with the cylinders (hereinafter indicated with 2a) of the group 3 of cylinders are connected to the crankshaft 8 by means of the interposition of respective connecting rods 10, each of which extends between two rotation axes 11, 12 parallel to one another and to the axis 9, and of which the axis 11 is the rotation axis of the connecting rod 10 with respect to a relative connecting rod pin 8a of the crankshaft 8 and the axis 12 is the rotation axis of the connecting rod 10 with respect to the relative piston 7a.

The pistons (hereinafter indicated with 7b) associated with the cylinders (hereinafter indicated with 2b) of the group 4 of cylinders are connected to the crankshaft 8 by means of the interposition of respective connecting rods 13, each of which extends between two rotation axes 14, 15 parallel to one another and to the axis 9, and of which the axis 14 is the rotation axis of the connecting rod 13 with respect to a corresponding connecting rod 10 and the axis 15 is the rotation axis of the connecting rod 13 with respect to the relative piston 7b.

As each connecting rod 13 is directly coupled to the corresponding connecting rod 10, the connecting rods 10, 13 of each pair of connecting rods 10 and 13 connected to one another are substantially coplanar to one another, extend substantially in a single containment plane P, and therefore have a relatively limited footprint in the direction 5.

Each cylinder 2a, 2b is delimited by a side wall 16 comprising two portions 17 with a semi-cylindrical shape opposite one another and two portions 18 with a flat shape opposite one another obtained between the portions 17.

Figure 7:
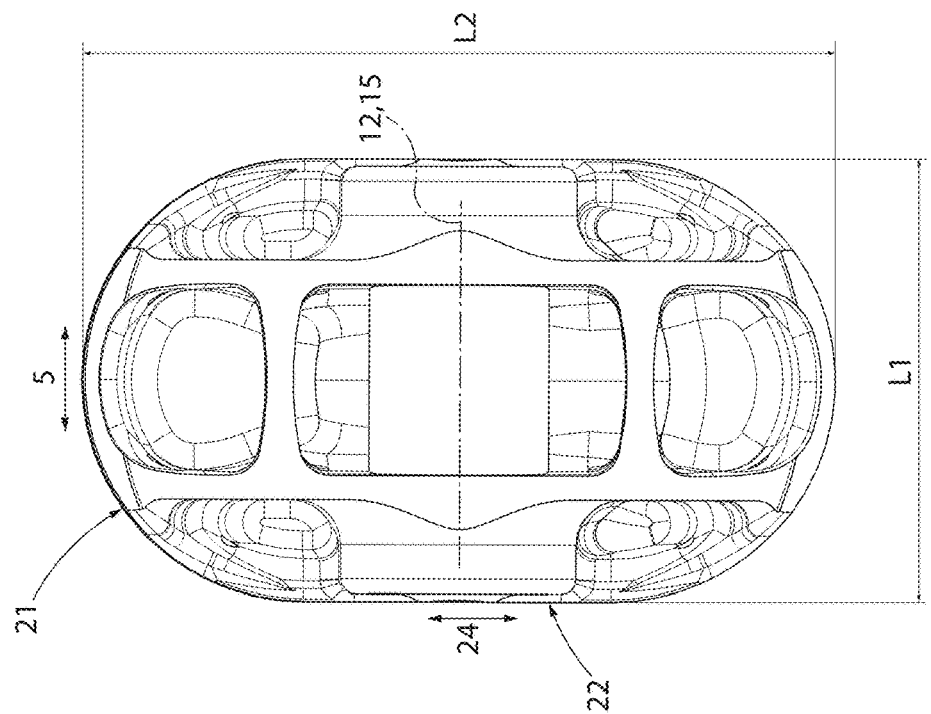
FIG. 7 is a schematic side view, with parts removed for clarity, of the detail of FIG. 6.
Figure 6:
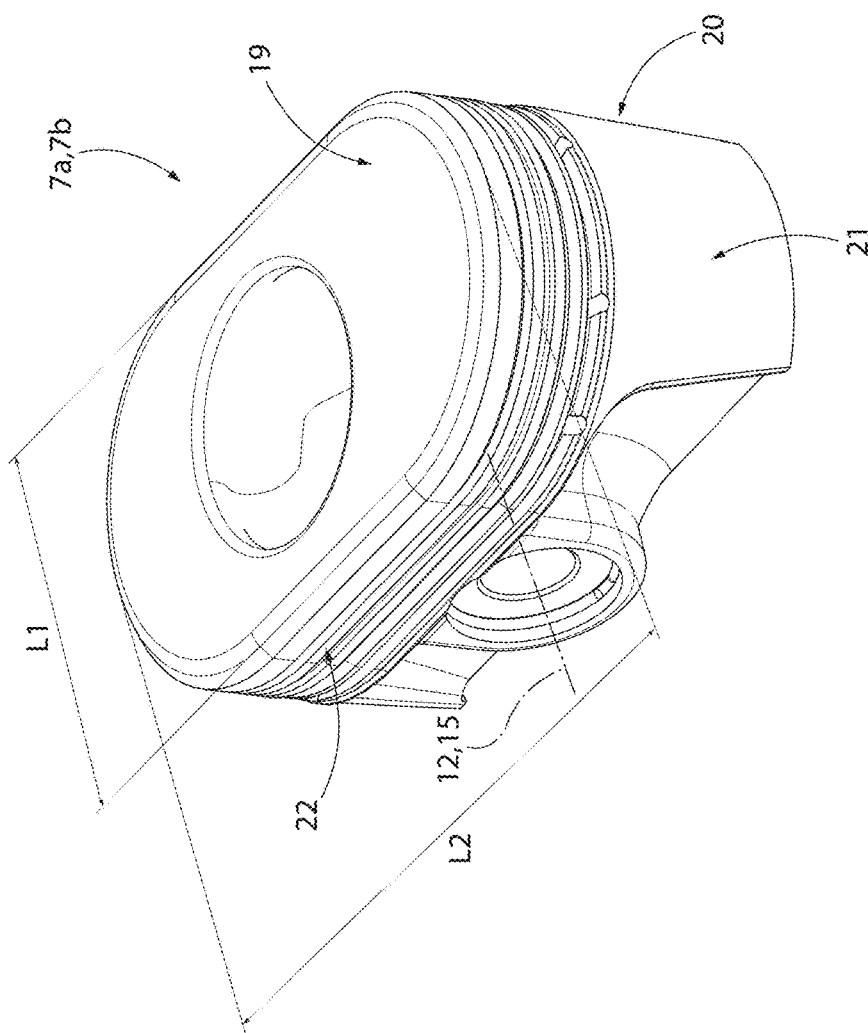
FIG. 6 is a schematic perspective view, with parts in section, of a detail of FIGS. 2 and 3.

According to what is shown in FIGS. 6 and 7, each piston 7a, 7b is delimited by a free face 19 facing the relative cylinder 2a, 2b, and is further delimited by a side wall 20 comprising two portions 21 with a semi-cylindrical shape opposite one another and two portions 22 with a flat shape opposite one another obtained between the portions 21.

The wall 20 is undercut so as to have two cavities 23 opposite one another, which are obtained at least at the portions 22, in particular both at the portions 21, and at the portions 22, and limit the friction between the piston 7a, 7b and the relative cylinder 2a, 2b.

The cylinders 2a, 2b and the relative pistons 7a, 7b are configured and oriented so that:

each piston 7a, 7b has a maximum width L1, measured parallel to the direction 5, less than the maximum width L2 measured parallel to a direction 24 parallel to the face 19 of the piston 7a, 7b and transverse to the direction 5; and each cylinder 2a, 2b has a maximum inner width L3, measured parallel to the direction 5, which rounds up the width L1 and a maximum inner width L4, measured parallel to the direction 24, which rounds up the width L2 and is greater than the width L3.

Each piston 7a, 7b also has a plurality of recesses 25, each of which is configured to accommodate a respective elastic band, known and not illustrated, designed to couple the piston 7a, 7b and the relative cylinder 2a, 2b to one another in a fluid-tight manner.

The driving engine 1 has some advantages mainly deriving from the fact that the groups 3, 4 of cylinders 2a, 2b have a relatively limited footprint in the direction 5 and that the cavities 23 guarantee relatively limited friction between the cylinders 2a, 2b and the relative pistons 7a, 7b.

The invention claimed is:

1. A driving engine for vehicles comprising a crankshaft mounted so as to rotate around a rotation axis; at least one first group of cylinders comprising, in turn, at least two first cylinders aligned with one another in a first direction, which is parallel to the rotation axis of the crankshaft; a first piston, which is engaged in each first cylinder in a sliding manner and is delimited by a free face; and at least one first connecting rod interposed between each first piston and the crankshaft; the free face of each first piston having a first width (L1) measured parallel to the first direction and a second width (L2) measured parallel to a second direction, which is transverse to the first direction; and characterized in that the first width (L1) of each first piston is smaller than the second width (L2);

a second group of cylinders comprising, in turn, a plurality of second cylinders, which are as many as the first cylinders, are aligned with one another in the first direction and are engaged, in a sliding manner, by respective second pistons connected to the crankshaft by means of respective second connecting rods;

wherein each first connecting rod is engaged by the crankshaft in a rotary manner and is directly coupled to a corresponding second connecting rod in a rotary manner.

2. The driving engine according to claim 1, wherein each first connecting rod is substantially coplanar to the corresponding second connecting rod.

3. The driving engine according to claim 1, wherein each second connecting rod extends between two rotation axes, one of them being the rotation axis of the second connecting rod with the first connecting rod and the other one being the rotation axis of the second connecting rod with the second piston.

4. The driving engine according to claim 1, wherein each second piston is delimited by a free face having said first width (L1) measured parallel to the first direction and said second width (L2) measured parallel to the second direction.

5. The driving engine according to claim 1, wherein each cylinder has a third width (L3) measured parallel to the first direction, which corresponds with said first width (L1), and a fourth width (L4) measured parallel to the second direction, which rounds up said second width (L2) and is greater than the third width (L3).

6. The driving engine according to claim 1, wherein each piston is delimited by a side wall comprising two first portions opposite with one another and with a substantially semi-cylindrical shape and two second portions opposite one another and with a substantially flat shape, each extending between the two first portions.

7. The driving engine according to claim 6, wherein the side wall has two cavities opposite one another.

8. The driving engine according to claim 7, wherein each cavity is formed at least within one second portion.

9. The driving engine according to claim 1, wherein each cylinder is delimited by a side wall comprising two first portions opposite with one another and with a substantially semi-cylindrical shape and two second portions opposite one another and with a substantially flat shape, each extending between the two first portions.

10. The driving engine according to claim 1, wherein each piston has a plurality or recesses, each configured to accommodate a respective elastic band designed to couple the piston and the relative cylinder to one another in a fluid-tight manner.

* * * * *